United States Patent [19]
Chen

[11] Patent Number: 5,913,064
[45] Date of Patent: Jun. 15, 1999

[54] METHOD FOR GENERATING INSTRUCTIONS FOR AN OBJECT-ORIENTED PROCESSOR

[75] Inventor: Chi-Chung K. Chen, San Bruno, Calif.

[73] Assignee: Sun Microsystems, Inc., Palo Alto, Calif.

[21] Appl. No.: 08/881,515

[22] Filed: Jun. 24, 1997

[51] Int. Cl.$^6$ ..................................................... G06F 69/44
[52] U.S. Cl. .......................... 395/702; 395/500; 395/406; 395/683; 395/685; 707/103
[58] Field of Search .................................... 395/702, 704, 395/705, 701, 500, 406, 683, 685, 380, 381, 390, 568; 707/103

[56] References Cited

U.S. PATENT DOCUMENTS

| | | | |
|---|---|---|---|
| 5,367,687 | 11/1994 | Tarsy et al. ............................ | 395/709 |
| 5,732,263 | 3/1998 | Havens et al. .......................... | 707/103 |
| 5,787,431 | 7/1998 | Shaughnessy ........................... | 707/100 |

OTHER PUBLICATIONS

O'Connor et al, "PicoJava–I: the Java Virtual Machine In Hardware," IEEE Micro, vol. 17, Issue 2, pp. 45–53, Apr. 1997.

Yonezawa et al, "Implementing Concurrent Object–Oriented Languages on Multicomputers," IEEE Parallel & Distributed Technology: Systems & Applications, vol. 1, Issue 2, pp. 49–61, May 1993.

Yu et al, "Optimized Code Generation for Programmable Digital Signal Processors," IEEE International Conference on Acoustics, Speech, and Signal Processing, vol. 1, pp. 461–464, Apr. 1993.

*Primary Examiner*—Tariq R. Hafiz
*Assistant Examiner*—Than Q. Dam
*Attorney, Agent, or Firm*—D'Alessandro & Ritchie

[57] ABSTRACT

A method for generating code for an object-oriented processor is disclosed. An instruction table is initialized to include a plurality of instructions for an object-oriented processor, each of the plurality of instructions having a set of operands and an operand type for each of the set of operands. In addition, a weighting table is initialized to include a set of the plurality of instructions and a weight for each of the set of the plurality of instructions, the weight indicating frequency of generation for a particular instruction. A class hierarchy is created, the class hierarchy having a plurality of classes stored in a tree data structure, each of the plurality of classes having a set of fields and a set of methods, each of the plurality of classes, each of the set of fields, and each of the set of methods having object-oriented properties. Within the class hierarchy, a set of objects is randomly generated for each of the plurality of classes. A method is selected from the sets of methods, and a set of instructions is generated for the selected method according to the instruction table and the weighting table using the class hierarchy.

38 Claims, 7 Drawing Sheets

METHOD FOR GENERATING INSTRUCTIONS FOR AN OBJECT-ORIENTED PROCESSOR

BACKGROUND OF THE INVENTION

1. Field of the Invention

The present invention relates to a method for generating instructions for an object-oriented processor for the purpose of testing the processor. More particularly, the invention relates to a method for generating instructions for use with a processor implementing the Java Virtual Machine (JVM).

2. The Background Art

Random code generators typically are used to provide instructions to fully test the capability of a processor. For example, a random code generator has been implemented for use with the Reduced Instruction Set Computer (RISC) processor.

An object-oriented program is organized upon a collection of objects, each of which is an instance of a class, or set of objects sharing a common structure and a common behavior. A property is an inherent or distinctive characteristic or feature that defines a particular object. A property may be static, or fixed, or dynamic. Thus, each object has the properties of its class.

Each object may comprise two types of components, fields and methods. A field, or instance variable, contains part of the state of an object. The fields of an object, therefore, constitute the structure of an object. A method, or member function, is a function that belongs to a particular class. Each method is an operation upon an object, similar to a subroutine or procedure.

In an object-oriented program, each class is a member of a hierarchy of classes which are related to one another through inheritance relationships. Through inheritance, a class shares the structure or behavior of one or more classes. Each derived class, or subclass, inherits some or all object properties from its parent class, or superclass. Furthermore, a derived class typically "specializes" its superclass, or superclasses, by redefining the existing structure or behavior. First, the derived class may add a new property not inherited from the parent class. For example, a new field not existing within a parent class may be created within the derived class. Second, a derived class may "override" an inherited property, thereby shadowing, or hiding, the property of the parent class. Overriding occurs when a method or field within a derived class has a name identical to a method or field within a parent class, in addition to having identical types. This results in only the method or field name defined within the subclass being visible within that subclass. For example, a method "TRANSMIT(INTEGER)" defined within both a derived class and a parent class results in the method defined within only the subclass being visible within that subclass. Third, a property within a derived class may be "overloaded" by using the same property name of the parent class, the property having different types than used in the parent class, resulting in two distinct properties being visible within the derived class. A field or method may be overloaded by using the same field or method name of the parent class with a different parameter type than used in the parent class, resulting in two distinct fields or methods rather than shadowing the parent field or method. For example, a method "TRANSMIT(INTEGER, FLOAT)" defined within a derived class and a method "TRANSMIT(INTEGER, INTEGER)" defined within a parent class will result in both methods being visible within the derived class. Both fields and methods may be added, shadowed or overloaded.

Within the class hierarchy, the classes, as well as the methods and fields of each class, may have one of three levels of visibility to other classes of objects. First, a class, method or field may be public. Public status ensures access by all classes of objects. Second, a private status may be selected. A private class, method or field is visible only to the objects of that particular class, and inaccessible by other classes of objects. Third, selecting a protected status allows access to the protected class, method or field from all derived classes of that class.

A given programming language may be strongly typed, weary typed, or untyped. Typing is the enforcement of the class of an object, which prevents objects of different types from being interchanged or, allows them to be interchanged only in very restricted circumstances. Thus, when a programming language is strongly typed, type conformance is strictly enforced. It follows that type consistency must be rigidly enforced when generating instructions for such a processor.

An object oriented processor requires that instructions be valid object-oriented instructions. A need exists in the prior art for an instruction generator for testing the features of an object-oriented processor. More particularly, a need exists in the prior art for an instruction generator for use with the JVM.

BRIEF DESCRIPTION OF THE INVENTION

A method for generating code for an object-oriented processor is presented. The generated instructions can then be executed by a simulator to fully test the object-oriented processor. While the present invention is of broad applicability and can be used in a variety of contexts, the presently preferred embodiment is designed specifically for use with the JVM. In accordance with the invention, an instruction table is initialized to include a plurality of instructions for an object-oriented processor, each of the plurality of instructions having a set of operands and an operand type for each of the set of operands. In addition, a weighting table is initialized to include a set of the plurality of instructions and a weight for each of the set of the plurality of instructions, the weight indicating frequency of generation for the corresponding instruction. A class hierarchy is created, the class hierarchy having a plurality of classes stored in a tree data structure, each of the plurality of classes having a set of fields and a set of methods, each of the plurality of classes, each of the set of fields, and each of the set of methods having object-oriented properties. Within the class hierarchy, a set of objects is randomly generated for each of the plurality of classes. A method is then selected from the sets of methods, and a set of instructions is generated for the selected method according to the instruction table, the weighting table, and the class hierarchy.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

An instruction generator of the present invention generates instructions for the purpose of testing an object-oriented processor. The generated instructions may then be executed by a code simulator. According to a presently preferred embodiment of the present invention, the generated instructions are written to a file for use by the code simulator. Therefore, the code generator and code simulator run independently. Alternatively, a code simulator may be designed to interface with the code generator.

According to a presently preferred embodiment of the present invention, the generated instructions may be run on a simulator for a hardware implementation of the JVM. According to another preferred embodiment of the present invention, the generated instructions may be run on a simulator for a software implementation of the JVM. In this manner, both simulators may be run in parallel one instruction at a time to verify the accuracy of the results.

The random code generator of the present invention generates code according to a class hierarchy based upon an instruction table, a weighting table, and a random number generator. In addition, an operand stack is used to store operands for each method. Unlike instructions for the RISC processor, the JVM instruction format does not specify operands for a particular instruction. Since operands are implicit within each instruction, the JVM requires that an operand stack be used to store operands for the JVM instruction set. However, one of ordinary skill in the art will recognize that data structures other than a stack may be appropriate for use with other object-oriented processors.

Code is generated according to an instruction table, which includes an instruction set for a particular architecture. According to the presently preferred embodiment, the instruction table comprises the instruction set for the JVM. However, one of ordinary skill in the art will appreciate That the instruction table may be used to generate instructions for a variety of architectures.

A bias or weighting file is used to control which instructions from the instruction table may be generated. Although the code generator randomly generates instructions, the weighting file may be used to bias the code generation in one or more directions. In this manner, the weighting file is used to control the "randomness" of the code generator. For example, the weighting file may include a set of instructions, each instruction having a particular weight. Therefore, a particular instruction within the instruction table may be generated more or less depending upon the weight given to the particular instruction in the weighting file. In this manner, it is possible to selectively generate instructions designed to test boundary conditions more frequently than less error-prone conditions. Since the weighting file contains information relating to the instruction set of the architecture, the weighting file is architecture dependent. The weighting file will initially contain the name of each instruction within the instruction table and a % corresponding to each instruction indicating the desired percentage that each instruction is to be generated. A user may choose not to specify a desired percentage for one or more instructions within the weighting file.

Figure 1:
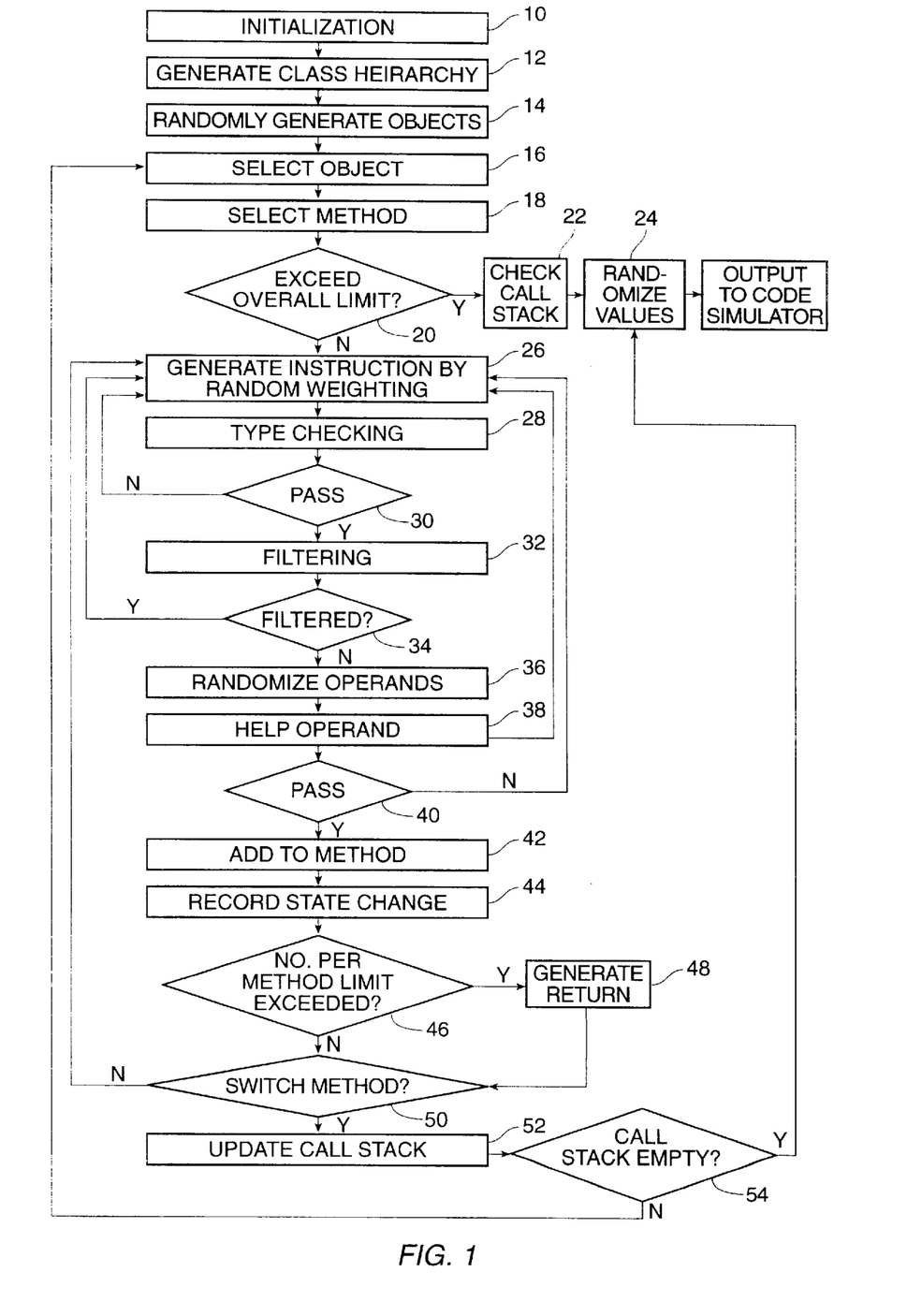
FIG. 1 illustrates the main program loop utilized in a preferred embodiment of the present invention.

Referring now to FIG. 1, a flow diagram of the main program loop according to a preferred embodiment of the present invention is shown. At step 10, initialization is performed. During initialization, an instruction file is read into an instruction table. Similarly, a weighting file is read into a weighting table. All instructions having a desired percentage equivalent to 0 are deleted from the weighting table, while instructions having a desired percentage greater than 0 are stored in the weighting table. According to a presently preferred embodiment of the present invention, the weighting table is stored in linked list format. Once the instructions having a desired percentage equivalent to 0 are deleted, the weighting table is converted to an array. However, one of ordinary skill in the art will recognize that the weighting table may be stored in alternative formats. Then, the percentages designated within the instruction table are added and subtracted from 100. Any remaining percentage is divided among the remaining instructions which do not have a specified desired percentage. If all instructions contain a desired percentage, if the total percentage is greater or less than 100, an appropriate error message is displayed.

During initialization, all counters are initialized. According to the presently preferred embodiment of the present invention, a user may specify the number of instructions to be generated according to a particular test. A total number of instructions generated counter, and a per method counter are initialized. In addition, a counter for each instruction in the instruction table is initialized. According to a presently preferred embodiment, the counters serve as limit to instruction generation. However, those of ordinary skill in the art will readily recognize that alternative means are available.

Next, at step 12, a class hierarchy comprising a plurality of classes is generated, each of the plurality of classes containing a set of fields and a set of methods. Next, at step 14, objects are randomly generated within each class of the class hierarchy to accommodate instructions which access an object. Next, at step 16, an object is selected. After the object is selected, at step 18, a method within the object is selected which will include a set of generated instructions. Each instruction, or instruction node, generated will be stored in an instruction list corresponding to the selected method.

After the object is selected, at step 18, a method compatible with the object is selected which will include a set of generated instructions. At this time, the per method counter is reset. First, the class of the object corresponding to the retrieved object is obtained. For example, if the class name is stored within the object, the class is obtained from the retrieved object. Then a random method within the class is obtained. According to a presently preferred embodiment of the present invention, the number of methods within the class is obtained. A random number is then generated between 1 and the number of methods. Next, the method corresponding to the random number is retrieved.

A call stack is implemented to store subroutine, or method, calls. When a method is called, the method is pushed onto the stack. According to one embodiment, the call stack stores the method and corresponding class. Upon a return from a method, the top of the call stack is popped from the stack. Call stacks are known in the art of software development.

Before generating a new instruction, at step 20, an overall instruction limit is checked against the total number of instructions generated. When the total number of instructions generated has exceeded the overall instruction limit, the code generator checks the call stack at step 22. For each method stored on the call stack, the method is popped off the stack and a return instruction is generated and stored within the corresponding method. When the call stack is empty, operand values are randomized for the generated instructions at step 24. If the total number of instructions generated has not exceeded the overall instruction limit, the code generator continues generating instructions at step 26. At step 26, an instruction is generated utilizing a random number generator and the weighting table.

Instructions may utilize as sources of operands an operand stack, an object field or method, both an operand stack and an source object field or method, or neither. For example, an iadd instruction uses only the operand stack. Some instructions access an object, while some do not access the operand stack or an object, such as an if instruction. However, some instructions, such as a PUTFIELD instruction, will access both the operand stack and an object field or method specified in the instruction.

If the source operand for the instruction is the operand stack, checking of type consistency of the operand stack and the instruction obtained in step 26 is performed at step 28. An instruction accesses the operand stack if a user has specified a number in the number of source operands field and a type within the type of source operands field within the instruction table array. For example, an ISTORE instruction specifies one integer is needed as the source operand. Therefore, the operand at the top of the operand stack will be checked to verify that this is in fact of type integer. If the operand stack does not contain the proper number and type of operands for the instruction, typechecking fails. Otherwise, typechecking passes.

At step 30, if typechecking fails, the current instruction is ignored and a new instruction is generated at step 26, unless the current instruction is not easily generated. For those instructions not easily generated by the code generator, typechecking is not performed, or an artificial pass is generated. These instructions are "helped" by a later function which provides operands of the desired type.

If typechecking passes, filtering is performed at step 32. Filtering is a way of minimizing generation of instructions which will most easily pass typechecking, since these instructions will be "over-generated". Similarly, filtering will maximize generation of instructions which are less likely to pass typechecking. For example, a PUSH instruction will always pass typechecking, while IADD will not always pass typechecking. A function determines whether filtering is performed depending upon the number of operands specified either in the source operand stack or source object fields. The greater the number of source operands, the less likely the instruction will be "filtered". At step 34, if the instruction is "filtered" out in this manner, the instruction is not stored, and a new instruction is generated at step 26. If the instruction "passes through" the filter, the resulting instruction is stored in the instruction node and the operands are randomly generated at step 36. At step 36, operands are randomly generated for each field and method used by the instruction.

Next, at step 38, a help operand function is performed if it is determined that the operand stack does not contain an operand of the appropriate type for the instruction. If the "help" function does not pass at step 40, the generate instruction loop is repeated at step 26. If the "help" function is successful, the resulting instruction node is added to the instruction list of the current method at step 42. In addition, all instruction counters, including the per method counter, counter for the total number of instructions generated, and a counter corresponding to each instruction table entry are incremented. Furthermore, according to an alternative embodiment, the "help function" is not included.

Next, any state change of the CPU is recorded at step 44, including any change of state in the operand stack and call stack. For example, the top of the stack is updated corresponding to the result of the generated instruction, consistent with the destination types in the corresponding entry in the instruction table. Moreover, if the result of the instruction is an instantiation of an object, the class is found and the object is added to the object list of that class.

Next, at step 46, it is checked whether the per method limit of instructions to be generated has been exceeded. If the limit has been exceeded, a return instruction is generated at step 48. This return instruction is added to the instruction list in the appropriate method.

At step 50, it is determined whether the method has been switched. Method switching can take place in two ways. First, method switching can occur between methods within an object (i.e., invoking a method from within another method). Second, method switching can occur between objects. If the last instruction generated is not an invoke or return instruction, the method is not switched and another instruction is generated at step 26. However, if the instruction generated is an invoke or return instruction, the method is switched.

If the method is switched, the call stack is updated at step 52. If the instruction is an invoke instruction, the method name and class name of the method are saved on the call stack. If the instruction is a return instruction, the top of the call stack is popped unless the call stack is empty. After the call stack is updated at step 52, it is determined whether the call stack is empty at step 54. If the call stack is not empty, a new object is selected at step 16, and the process is repeated as discussed above. However, if the call stack is empty, code generation is completed, and operand values for the generated instructions are created at step 24. However, one of ordinary skill in the art will readily recognize that alternative means for limiting generation of instructions are possible.

At step 24, values for all operands stored in each of the operand stacks are randomized and stored. This initializes each of the operand stacks for further use by a code simulator. Within each method having at least one generated instruction, in the reverse order that the instructions will be run, the opposite of the instruction is performed. For example, if the last instruction is an IADD instruction, to run the instruction, two integer operands will be popped off the stack, and the result will be pushed on the stack. Therefore, first the operand will be popped off the stack, then two integer values will be randomly generated and pushed onto the stack. In this manner, all values necessary for code execution by a code simulator are stored in the operand stack.

Figure 2:
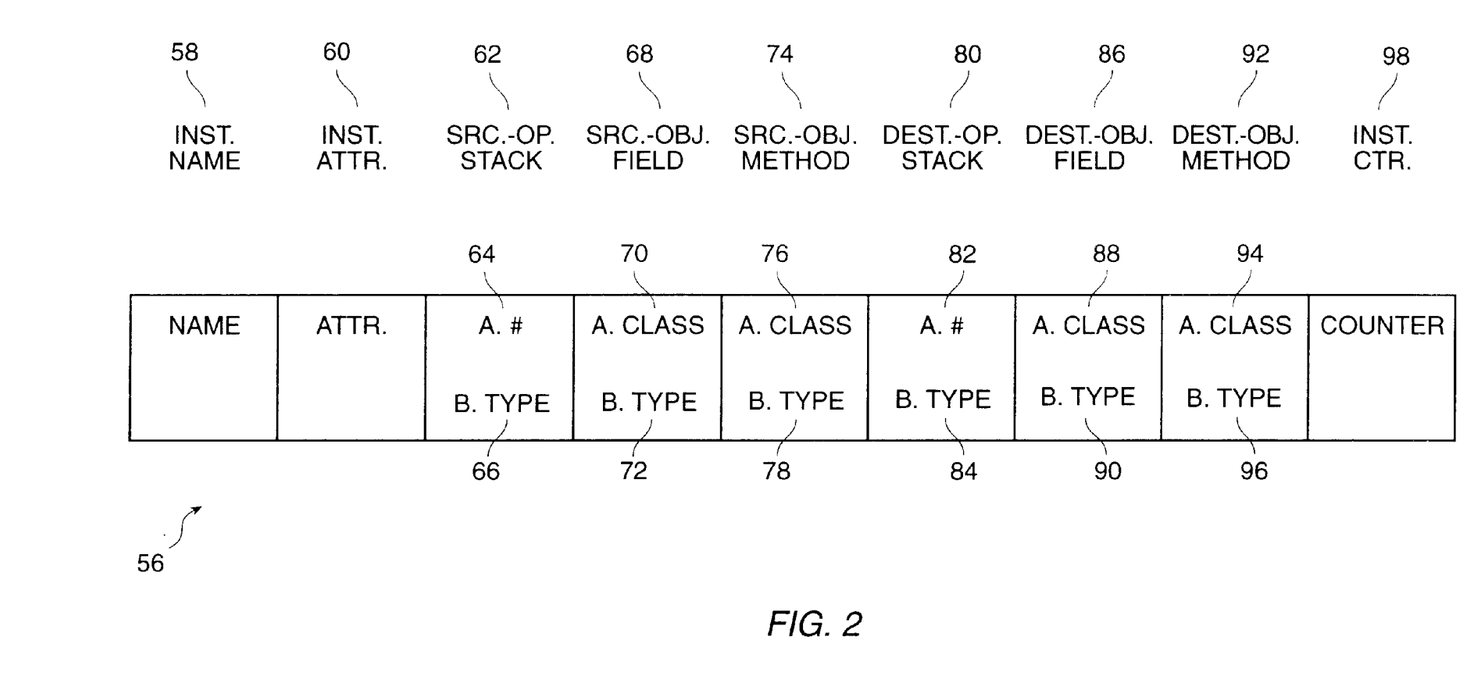
FIG. 2 illustrates an instruction table according to a presently preferred embodiment of the present invention.

Referring now to FIG. 2, an instruction table 56 according to a presently preferred embodiment of the present invention is presented. According to a presently preferred embodiment, each instruction in the instruction table comprises several fields. First, an instruction name ("Inst.name") 58 is specified. Second, an instruction attribute ("Inst.attr.") 60 is specified. An instruction attribute may comprise "alu", "method", "object", or "memory", indicating an overall effect of the instruction. For example, if the instruction utilizes a method, the instruction attribute field will denote "method". Third, if the source of the operand(s) is the operand stack ("Src.-op stack") 62, the number 64 and type 66 of the source operands is specified. The "type" field 66 may be one of three types: access type, value type and attribute type. Fourth, if the source of an operand is an object field ("Src.-obj. field") 68 rather than the operand stack, the class 70 and type 72 of the field (i.e., access, value, attribute) is specified. The class 70 may remain unspecified. Furthermore, the superclass, or parent, of the current class may be specified to facilitate instruction generation. Fifth, if the source of the operand is an object method ("Src.-obj. method") 74 rather than the operand stack, the class 76 and type 78 of the method (i.e., access type, value/return type, attribute type) is specified. Sixth, if the destination of the instruction is the operand stack ("Dest.-op.stack") 80, the number 82 and type 84 (i.e., access, value, attributee) of the destination operands is specified. Seventh, if the destination is an object field("Dest.-obj.field") 86 rather than the operand stack, the class 88 and type 90 of the field is specified. Eighth, if the destination is an object method ("Dest.-obj. method") 92 rather than the operand stack, the class 94 and type 96 of the method is specified. Ninth, an instruction counter ("Inst. ctr.") 98 for each instruction in the instruction table is stored. The instruction table may be stored as an array, or other suitable format. Those fields which are not used in a particular instruction are left blank by the user.

Various instructions will use select fields within the instruction table. For example, a GETFIELD instruction has an object as the source operand and the operand stack contains the destination operand. Similarly, a PUTFIELD instruction pops an operand from the stack and stores the operand in an object field. Therefore, the source of the PUTFIELD instruction is the operand stack, while the destination of the instruction is an object field.

Figure 3:
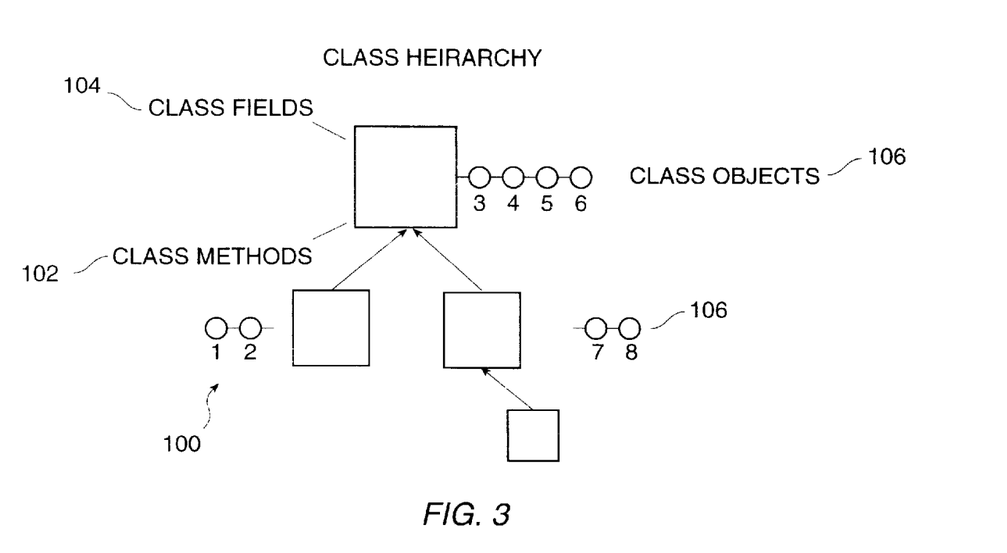
FIG. 3 illustrates a class hierarchy according to a presently preferred embodiment of the present invention.

Referring now to FIG. 3, a class hierarchy 100 according to a presently preferred embodiment of the present invention is shown. According to a presently preferred embodiment of the present invention, the class hierarchy 100 is implemented in a tree data structure, with each node maintaining a pointer to its parent node. As the class hierarchy is created, each class leaf node is stored in a leaf node list (i.e., a linked list). However, one of ordinary skill in the art will recognize that alternative storage formats and retrieval mechanisms are available. Within the class hierarchy, the object oriented features, such as inheritance and overriding are represented. For example, a field having the same name and attributes within a class and derived class will result in shadowing within the derived class. For testing purposes, all classes comprise a "public" access type. Within each class, all class methods 102, class fields 104 and objects 106 are stored.

During step 12, a class hierarchy comprising a plurality of classes is generated, including a set of fields and a set of methods for each class. All possible permutations of methods within each class are created for all possible access types, attribute types, and value types. For example, the access type may comprise public, private and protected. Similarly, the attribute type may comprise static and instance. The value type may comprise long, integer, object, and float. A random number of each method is created. A "pseudorandom" number generator is used in all instances where a random number is generated.

Figure 4:
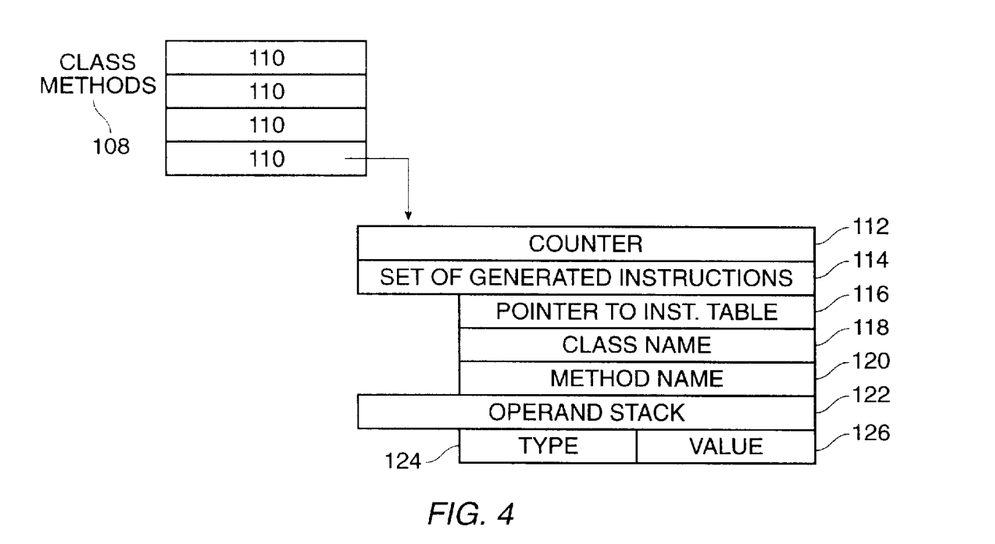
FIG. 4 illustrates one embodiment of a data structure used to store class methods.

Referring now to FIG. 4, one embodiment of a data structure used to store class methods 108 is illustrated. Each method is separately identifiable. According to a presently preferred embodiment of the present invention, a unique number 110 is associated with each permutation for identification purposes. According to one embodiment, an updated instruction counter 112 containing the number of instructions generated for that particular method is stored. Each method is associated with a set of instructions 114 generated by the code generator for that particular method. Each instruction comprises a pointer 116 to an entry in the instruction table, as well as class name 118 and field/method name 120 of each object to be used by the instruction. In addition, each method is associated with an operand stack 122. The operand stack stores a type 124 and value 126 for each operand required by the method. These operand types 124 will be used for typechecking purposes by the code generator, while the operand values 126 will be generated at the end of code generation for use by a code simulator. Although a stack is used to store the operands for each method, one of ordinary skill in the art will recognize that alternative data structures may be used.

Similarly, all possible permutations of fields within each class are created for all possible access types, attribute types, and value types. For example, the access type may comprise public, private and protected. Similarly, the attribute type may comprise static and instance. The value type may comprise long, integer, object, and float. A random number of each field is created.

Figure 5:
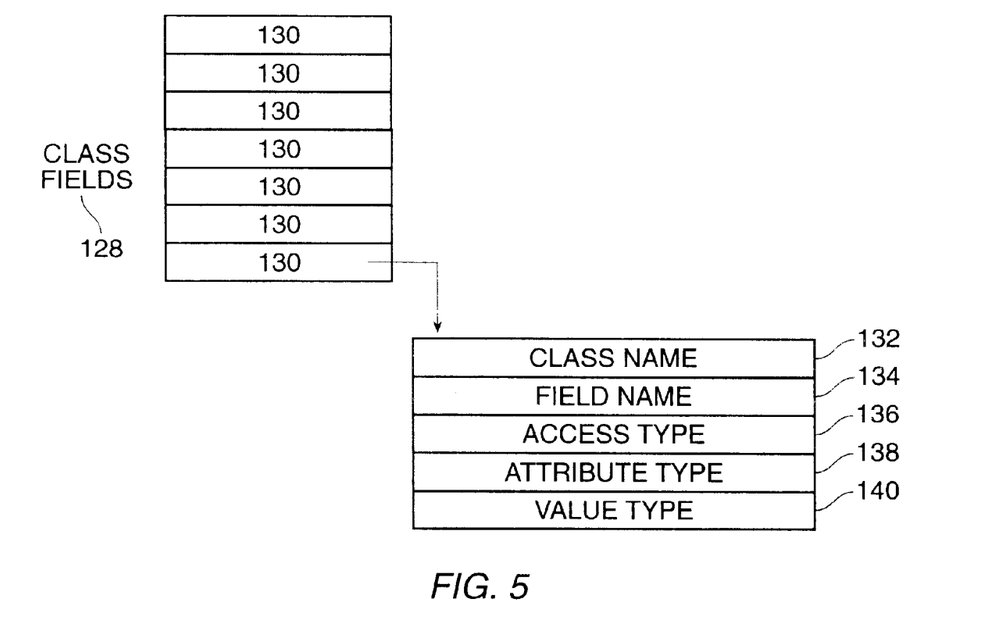
FIG. 5 illustrates one embodiment of a data structure used to store class fields.

Referring now to FIG. 5, one embodiment of a data structure used to store class fields 128 is illustrated. Static fields may be initialized upon creation of the class to accommodate a code simulator which shares these data structures. Each permutation, or field, is separately identifiable. According to a presently preferred embodiment of the present invention, a unique number 130 is associated with each permutation for identification purposes. Each field is associated with a class name 132, field name 134, access type 136, attribute type 138, and value type 140.

Figure 6:
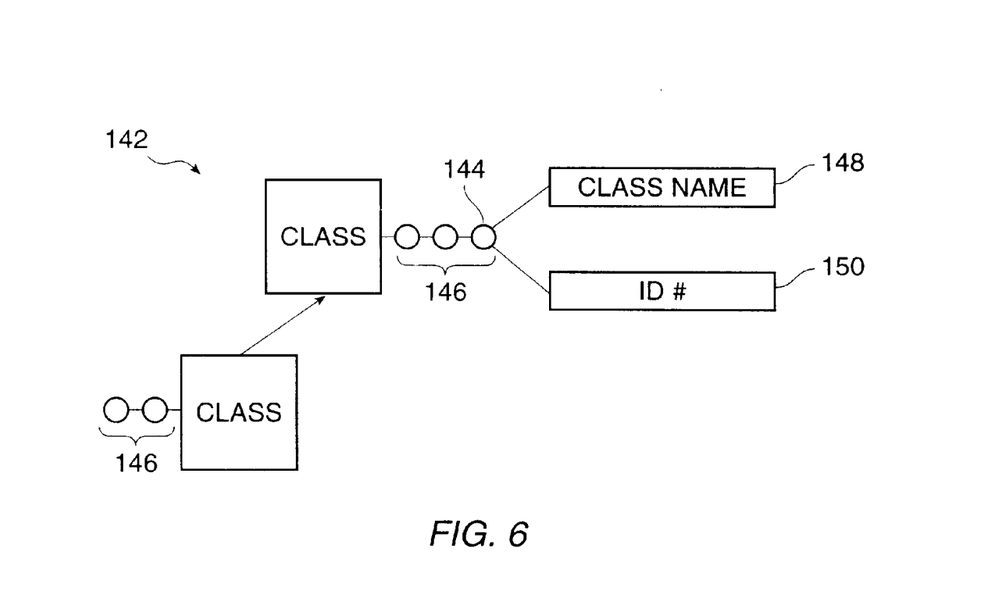
FIG. 6 illustrates an embodiment of a data structure used to store objects within the class hierarchy.

Referring now to FIG. 6, an embodiment of a data structure used to store objects 142 within the class hierarchy is illustrated. During step 14, objects are randomly generated within each class of the class hierarchy. According to a presently preferred embodiment of the present invention, the class hierarchy is traversed upward for each leaf node in the leaf node list. However, one of ordinary skill in the art will recognize that any ordered traversal of the class hierarchy is possible. For each class within the class hierarchy, a random number of objects within each class is created.

According to one embodiment of the present invention, a new random number between and including a lower boundary and an upper boundary is generated to determine a number of objects to create within the class. Random number generators are known in the art of software development. According to a presently preferred embodiment of the present invention, the lower boundary is 1 and the upper boundary is 5. However, one of ordinary skill in the art will recognize that these boundary choices serve as a practical limit, and are purely arbitrary.

For each object to be generated, an object is instantiated and stored in an object node 144. A parameterized class cannot have instances unless it is first instantiated. Instantiation creates an object, or instance of a particular class. Any instance fields within the object node are initialized using a random number generator. The object node 144 is then associated with the class in an object list 146. For example, the class name 148 may be stored within the object node 144 to provide for efficient access of the class name from an accessed object during code generation. Each object is separately identifiable. According to a presently preferred embodiment of the present invention, a unique object number 150 is associated with the object node 144 for identification purposes.

Figure 7:
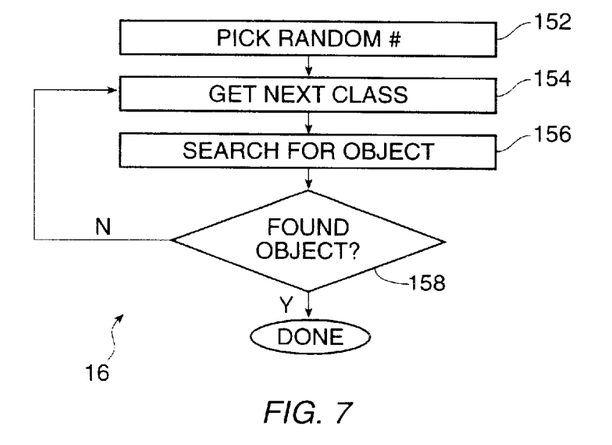
FIG. 7 illustrates a method for selecting an object as shown in FIG. 1 according to a presently preferred embodiment of the present invention.

Referring now to FIG. 7, a method for selecting an object 16 as shown in FIG. 1 according to a presently preferred embodiment of the present invention is presented. Using a "random seed" generator, or pseudorandom number generator, a random number between 1 and the number of objects is selected at step 152. The object having a unique object number equivalent to the random number is then retrieved.

According to a presently preferred embodiment of the present invention, the object is retrieved through traversal of the class hierarchy. For example, a class may be selected at step 154, and the objects within the class may be searched for the desired object at step 156. If the object is not found at step 158, another class may be searched. According to a presently preferred embodiment of the present invention, the leaf node list may be used to enable tree traversal. For example, a leaf node may initially be obtained. If the object is not found within this class and the class has a parent, the class hierarchy is traversed upward, and the parent class is obtained. If the object is not found and the class has no parent, the class hierarchy is traversed downward through an alternate direction, and the child class is obtained. One of ordinary skill in the art, however, will recognize that alternative methods of tree traversal are possible.

Figure 8:
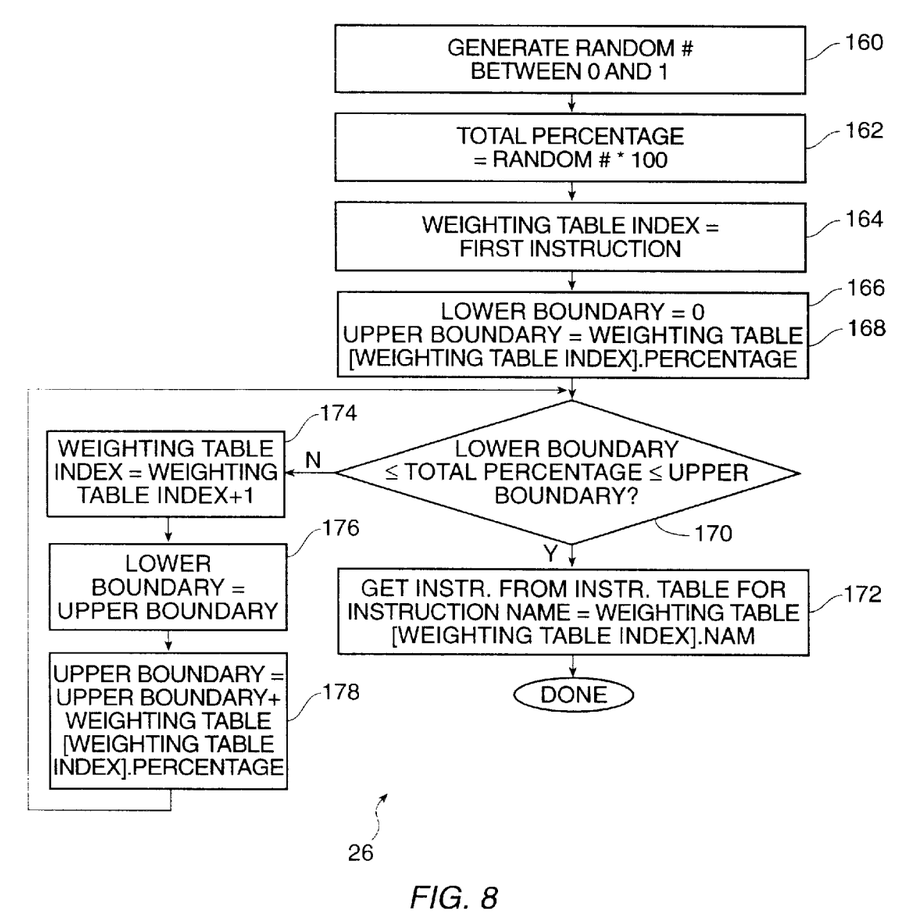
FIG. 8 illustrates a method for generating an instruction, shown in FIG. 1, utilizing a random number generator and the weighting table according to a preferred embodiment of the present invention.

Referring now to FIG. 8, a method for generating an instruction 26, shown in FIG. 1, utilizing a random number generator and the weighting table according to a preferred embodiment of the present invention is presented. At step 26, an instruction is generated utilizing a random number generator and the weighting table. First, at step 160, a random number is generated between 0 and 1. Then, the instruction corresponding to the random number is retrieved according to the procedure shown. At step 162, a TOTAL PERCENTAGE is initialized to a random number multiplied by 100. In addition, a WEIGHTING TABLE INDEX is initialized to index the first instruction in the weighting table at step 164. A LOWER BOUNDARY is initialized to 0 at step 166. An UPPER BOUNDARY is initialized to the percentage within the weighting table entry indexed by the WEIGHTING TABLE INDEX at step 168. At step 170, if the TOTAL PERCENTAGE lies between the LOWER BOUNDARY and the UPPER BOUNDARY then at step 172 an instruction is retrieved from the Instruction Table corresponding to the instruction indexed within the weighting table corresponding to the WEIGHTING TABLE INDEX. At step 170, if the TOTAL PERCENTAGE is not between the LOWER BOUNDARY and the UPPER BOUNDARY, the search continues. At step 174 WEIGHTING TABLE INDEX is incremented by 1. Next, at step 176 LOWER BOUNDARY is set equal to the UPPER BOUNDARY. Next, at step 178 UPPER BOUNDARY is set equal to the sum of the UPPER BOUNDARY and the percentage in the weighting table corresponding to the WEIGHTING TABLE INDEX. The loop repeats at step 170. According to an alternative embodiment of the present invention, the upper and lower boundaries may be precalculated. Moreover, one of ordinary skill in the art will recognize that alternative methods for selecting an instruction according to a weighting table are possible.

According to a presently preferred embodiment of the present invention, at the get instruction step, a string compare on the name field is used to find an instruction in the Instruction Table corresponding to the instruction indexed within the weighting table corresponding to the WEIGHTING TABLE INDEX (i.e., INSTRUCTION NAME= WEIGHTING TABLE[WEIGHTING TABLE INDEX] .NAME). Once the instruction is obtained, the operable source fields within the instruction can be checked with the current state of the CPU, such as the operand stack.

Figure 9:
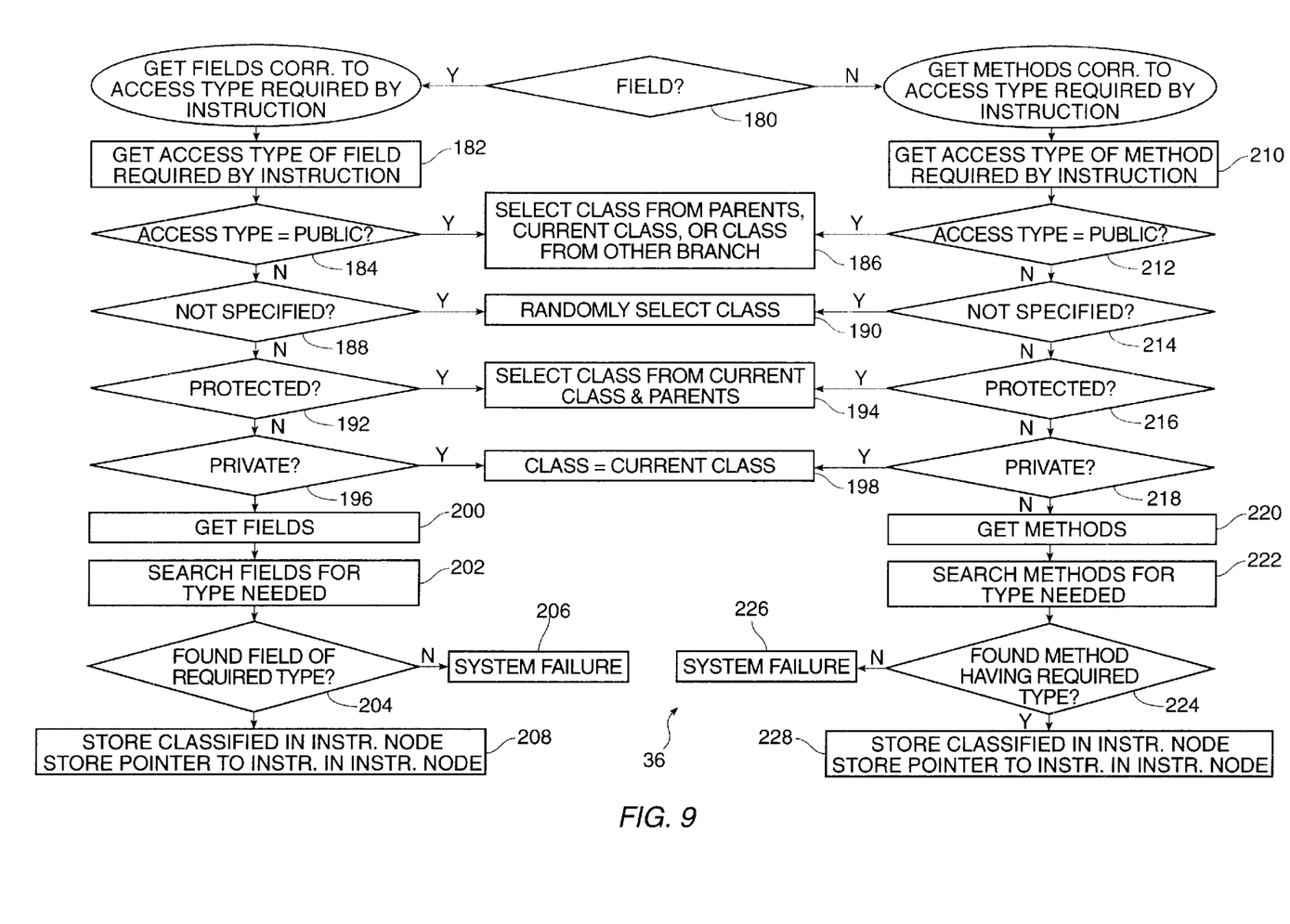
FIG. 9 illustrates a method for randomly generating operands, shown in FIG. 1, according to a presently preferred embodiment of the present invention.

Referring now to FIG. 9, a method for randomly generating operands 36, shown in FIG. 1, according to a presently preferred embodiment of the present invention is presented. Operands are randomly generated for each field and method used by the instruction. If the instruction requires a source object field or method, an object field or method having compatible access, attribute and value types with the instruction is selected. An instruction accesses the source object field if the user has specified the class of the source object field and the value type of the source object field in the instruction table. According to a presently preferred embodiment of the present invention, an instruction may access only one source object.

At step 180, if the instruction indicates that a source object field is required, an appropriate field is selected. The fields are selected depending upon the type of the field required by the instruction. According to a presently preferred embodiment of the present invention, the access type of the field required by the instruction is determnined at step 182. Next, a class is selected according to the access type of the source fields of the instruction. For example, the superclass of the current class can be specified. At step 184, if the access type is public, the class fields of any parent up to the root, as well as the current class, in addition to a class from another unrelated branch, may be selected at step 186; one of these classes is randomly selected. At step 188, if the access type is not specified, a class is randomly selected at step 190. At step 192, if the access type is protected, the class fields of any parent up to the root, as well as the current class may be selected at step 194; one of these classes is randomly selected. If, however, at step 196, the access type of the source object field is private, the current class is selected at step 198. The fields corresponding to the selected class are obtained at step 200. One of ordinary skill in the art will readily recognize that steps 184–198 may be performed in an alternate order.

At step 202, the fields corresponding to the selected class are searched for a field having access, value and attribute types compatible with the access type of the field required by the instruction. Both value and attribute types must be equivalent. If the access type required by the instruction is private, the access type of the chosen field must be private. If the access type required by the instruction is protected, the access type of the chosen field must be protected. However, if the access type required by the instruction is public, the access type of the chosen field may be public or protected, depending upon the relationship between the selected class and the current class. If the current class is a child of the selected class, the access type of the chosen field may be public or protected. Otherwise, the access type of the chosen field must be public.

At step 204, it is determined whether a field having the required types is found. There are several possibilities. First, if multiple fields have the attributes required by the instruction, a random selection is made. Second, if only one field has the type required by the instruction, this field is selected. Third, if none of the fields satisfy the instruction format, a system failure has occurred at step 206. However, since fields having all possible attributes are created during class generation, the search cannot fail. According to a presently preferred embodiment of the present invention, at step 208, the class name and field name are then stored in the instruction node, along with a pointer to the corresponding instruction. For example, for a PUTFIELD) instruction the class and field name are stored, for easy execution by a code simulator. However, an INVOKE instruction will require that a class and method name be stored.

At step 180, if the instruction indicates that a source object method is required, an appropriate method is selected, and the method is switched. The methods are selected depending upon the type of the method required by the instruction. According to a presently preferred embodiment of the present invention, the access type of the method required by the instruction is determined at step 210. At step 212, if the access type is public, the class methods of any parent up to the root, as well as the current class, in addition to the class methods from branches not related to the current class, may be selected at step 186; one of these classes is randomly selected. At step 214, if the access type is not specified, a class is randomly selected at step 190. At step 216, if the access type is protected, the class methods of any parent up to the root, as well as the current class may be selected at step 194; one of these classes is randomly selected. At step 218, if the access type of the source object method is private, the current class is selected at step 198. The methods corresponding to the selected class are obtained in step 220. One of ordinary skill in the art will readily recognize that steps 212–218 may be performed in an alternate order.

At step 222, the methods corresponding to the selected class are searched for a method having access, value and attribute types compatible with the access type of the method required by the instruction. Both value and attribute types must be equivalent. If the access type required by the instruction is private, the access type of the chosen method must be private. If however, the access type required by the instruction is protected, the access type of the chosen method must be protected. However, if the access type required by the instruction is public, the access type of the chosen method may be public or protected, depending upon the relationship between the selected class and the current class. If the current class is a child of the selected class, the access type of the chosen method may be public or protected. Otherwise, the access type of the chosen method must be public.

At step 224, it is determined whether a method having the required types is found. There are several possibilities. First, if multiple methods have the attributes required by the instruction, a random selection is made. Second, if only one method has the type required by the instruction, this method is selected. Third, if none of the methods satisfy the instruction format, a system failure has occurred at step 226. However, since methods having all possible attributes are created during class generation, the search cannot fail. According to a presently preferred embodiment of the present invention, at step 228, the class name and method name are then stored in the instruction node, along with a pointer lo the corresponding instruction. For example, for a PUTFIELD instruction the class and field name are stored, for easy execution by a code simulator.

Figure 10:
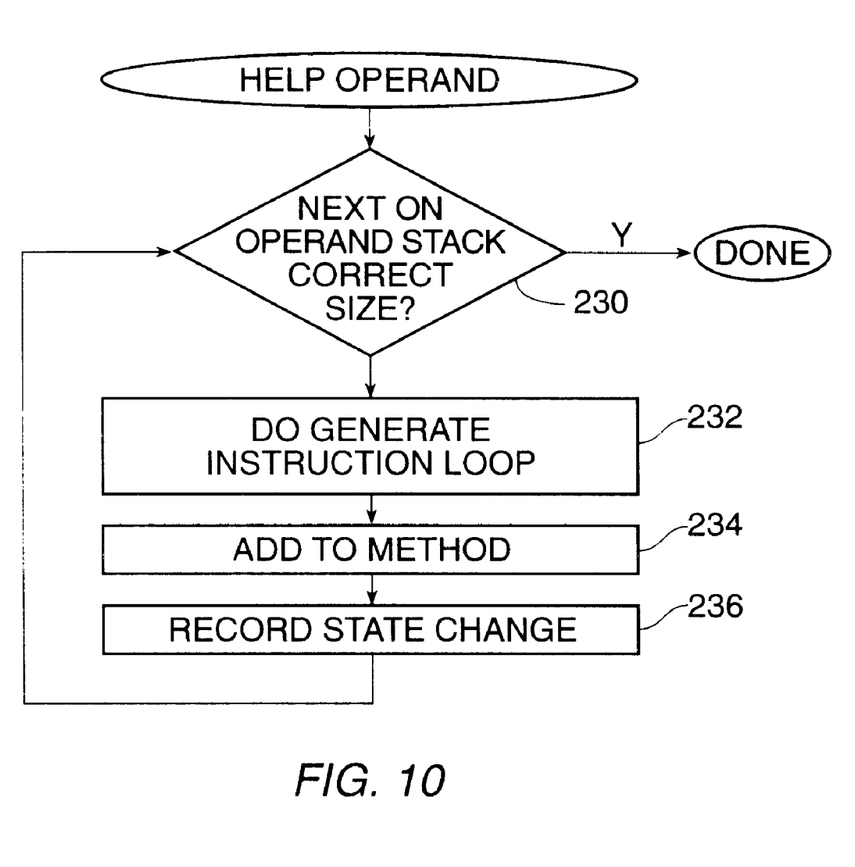
FIG. 10 illustrates a help operand function shown in FIG. 1 according to a presently preferred embodiment of the present invention.

Referring now to FIG. 10, a help operand function 38 shown in FIG. 1 according to a presently preferred embodiment of the present invention is shown. A help operand function is performed if it is determined at step 230 that the operand stack does not contain an operand of the appropriate type for the instruction. As time goes on, the operand stack is less likely to contain an operand of a desired type according to the weighting table. In order to provide an operand of a specific type, two HELP OPERAND functions are provided. Both help operand functions utilize the generate instruction loop at step 232 to create an appropriate instruction to provide the desired operands.

A FIRST ORDER HELP function provides an operand to be used for a current instruction. For example, if the operand stack is empty, a desired operand type may be generated and pushed onto the stack. Therefore, an operand is provided one instruction prior to the current instruction.

Similarly, a SECOND ORDER HELP function is used to provide an operand two instructions prior to the current instruction where it is not possible to create a desired operand stack with FIRST ORDER HELP.

It is determined whether first or second order help is required to generate the instruction, based upon the instruction being generated, and a corresponding help instruction is chosen. This is performed by backtracing the instructions according to the operand stack to undo the operand stack. In the reverse order that the instructions will be run, the opposite of the instruction is performed. For example, if the last instruction is an IADD instruction, to run the instruction, two integer operands will be popped off the stack, and the result will be pushed on the stack. Therefore, first the operand will be popped off the stack, then two integer values will be randomly generated and pushed on to the stack. According to a presently preferred embodiment of the present invention, if more than two instructions must be backtraced, the help function fails and the instruction is not added to the instruction list for the current method. Otherwise, an appropriate help instruction is generated for manipulation of the stack, such as a PUSH instruction. For FIRST ORDER HELP, the help instruction is added to the instruction list of the current method at step 234 and a corresponding operand is pushed onto the operand stack of the current method at step 236. For SECOND ORDER HELP, the help instruction is inserted in the instruction list of the current method at step 234 and the remaining instructions are restored. Similarly, at step 236, a corresponding operand is pushed onto the operand stack of the current method and the operand stack is restored by replacing the remaining operands.

In this manner, instructions and corresponding operands are generated according to an instruction table and a weighting table. The generated instructions are merged with the corresponding operands within the operand stacks. These instructions are then written to a file for use by a simulator.

While embodiments and applications of tis invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for generating code for an object-oriented processor, comprising the following steps:

initializing an instruction table to include a plurality of instructions for an object-oriented processor, each of the plurality of instructions having a set of operands and an operand type for each of the set of operands;

initializing a weighting table to include a set of the plurality of instructions and a weight for each of the set of the plurality of instructions, the weight indicating frequency of generation for the corresponding instruction;

creating a class hierarchy, the class hierarchy having a plurality of classes stored in a tree data structure, each of the plurality of classes having a set of fields and a set of methods, each of the plurality of classes, each of the set of fields, and each of the set of methods having object-oriented properties;

randomly generating a set of objects within the class hierarchy for each of the plurality of classes;

selecting a method for which to generate instructions, the method being selected from the sets of methods; and generating a set of instructions for the selected method according to the instruction table and the weighting table using the class hierarchy.

2. The method according to claim 1, the step of selecting a method further comprising the following steps:

randomly selecting an object from the class hierarchy;

determining a class of the selected object; and selecting a method within the class of the selected object.

3. A method for generating code for an object-oriented processor, comprising the following steps:

initializing an instruction table to include a plurality of instructions for an object-oriented processor, each of the plurality of instructions having a set of operands and an operand type for each of the set of operands;

initializing a weighting table to include a set of the plurality of instructions and a weight for each of the set of the plurality of instructions, the weight indicating frequency of generation for the corresponding instruction;

creating a class hierarchy, the class hierarchy having a plurality of classes stored in a tree data structure, each of the plurality of classes having a set of fields and a set of methods, each of the plurality of classes, each of the set of fields, and each of the set of methods having object-oriented properties;

randomly generating a set of objects within the class hierarchy for each of the plurality of classes;

selecting a method for which to generate instructions, the method being selected from the sets of methods;

pushing the selected method onto a call stack;

generating a set of instructions for the selected method according to the instruction table and the weighting table using the class hierarchy; and popping the selected method from the call stack upon completion of the step of generating.

4. The method according to claim 3, further comprising the following steps:

repeating the steps of selecting, pushing, generating and popping until a specified number of instructions are generated;

popping each method from the call stack;

storing a return instruction within a set of instructions corresponding to each method popped from the call stack; and randomly generating operand values for each of the generated instructions when the call stack is empty.

5. The method according to claim 3, the step of generating further comprising the following steps:

selecting an instruction from the weighting table.

6. The method according to claim 5, wherein the step of selecting is performed using a random number generator.

7. The method according to claim 3, the step of generating further comprising the following steps:

updating an operand stack corresponding to the selected method, the operand stack having an operand type for each operand used by the selected instruction.

8. The method according to claim 7, including the further step of:

storing a value for each operand within the operand stack corresponding to the set of generated instructions.

9. The method according to claim 7, including the further step of:

storing a value for each operand within the operand stack corresponding to each of the set of generated instructions, the step of storing being performed when the call stack is empty and when the set of instructions contains at least one instruction.

10. The method according to claim 9, the step of storing further comprising the following steps:

selecting a last instruction generated within the set of instructions;

popping a result for the last instruction from the top of the operand stack;

randomly generating operand values necessary for performance of the last instruction; and pushing the generated operands on to the top of the operand stack.

11. The method according to claim 7, the step of generating further comprising the following steps:

checking equivalence of operand types between the operand stack and the operand type required by the selected instruction if a corresponding entry in the instruction table indicates that an operand for the generated instruction is obtained from the operand stack; and ignoring the selected instruction when the operand types are not equivalent.

12. The method according to claim 11, the step of generating further comprising the following steps:

repeating the steps of selecting, checking and ignoring when the operand types are not equivalent.

13. The method according to claim 7, the step of generating further comprising the following steps:

checking equivalence of operand types between the operand stack and the operand type required by the selected instruction if a corresponding entry in the instruction table indicates that an operand for the generated instruction is obtained from the operand stack; and ignoring the selected instruction when the operand types are not equivalent if the selected instruction is of a predefined type.

14. The method according to claim 13, the step of generating further comprising the following steps:

filtering the selected instruction according to the operand types of the selected instruction and the number of operands of the selected instruction, the selected instruction being ignored if the operand types are of a predefined type and the number of operands are of a predefined number.

15. The method according to claim 14, the step of generating further comprising the following steps:

repeating the steps of selecting, checking, ignoring and filtering when the selected instruction is ignored.

16. The method according to claim 15, the step of filtering further comprising the following steps:

storing the selected instruction in an instruction node if the instruction is not ignored.

17. The method according to claim 7, the step of generating further comprising the following steps:
checking equivalence of operand types between the operand stack and the operand type required by the selected instruction if a corresponding entry in the instruction table indicates that an operand for the selected instruction is obtained from the operand stack;
performing first order help, pushing an operand on top of the operand stack if it allows the selected instruction to be added to the set of generated instructions; and
performing second order help, pushing an operand below the top of the operand stack if it allows the selected instruction to be added to the set of generated instructions.

18. The method according to claim 17, the step of performing first order help further comprising:
creating an operand having the operand type required by the selected instruction when the operand types are not equivalent if the selected instruction is not of the predefined type;
pushing the operand on the operand stack;
creating an instruction corresponding to the step of pushing; and
including the instruction in the set of generated instructions.

19. The method according to claim 17, the step of performing second order help further comprising
backtracing the set of instructions and the operand stack;
creating an operand having the operand type required by the selected instruction when the operand types are not equivalent if the selected instruction is not of the predefined type;
pushing the operand on the operand stack;
restoring operands removed from the operand stack in the step of backtracing;
creating an instruction corresponding to the step of pushing;
including the instruction in the set of generated instructions; and
restoring instructions removed from the set of generated instructions in the step of backtracing.

20. The method according to claim 19 the step of backtracing further comprising the following steps:
performing a last instruction in the set of instructions in the reverse order;
updating the operand stack corresponding to the step of performing; and
repeating the steps of performing and updating to a predefined point.

21. The method according to claim 20, wherein the predefined point is where an operand can be added to the operand stack to allow the selected instruction to be added to the set of generated instructions.

22. The method according to claim 20, wherein the predefined point is when two instructions have been backtraced.

23. The method according to claim 17 further comprising the step of:
adding the instruction node to the set of instructions if first order help is performed;
adding the instruction node to the set of instructions if second order help is performed; and
adding the instruction node to the set of instructions if the step of checking indicates that the operand types are equivalent.

24. The method according to claim 23, further comprising the step of:
updating ail instruction counters corresponding to the total number of instructions generated, number of instructions generated per method and each entry in the instruction table.

25. The method according to claim 24, further comprising the following steps:
generating a return instruction if the number of instructions generated per method exceeds a predefined number; and
adding the return instruction to the set of instructions.

26. The method according to claim 23, further comprising the following steps:
updating the call stack corresponding to the added instruction node;
updating the operand stack according to the added instruction node, pushing the result of the instruction on the operand stack; and
creating an object when produced by the added instruction node.

27. The method according to claim 23, further comprising the following steps:
saving a method on the call stack if the added instruction node comprises an invoke instruction, the method being the source operand of the added instruction node; and
popping the top off the call stack if the added instruction node comprises a return instruction if the call stack is not empty.

28. The method according to claim 3, the step of initializing the instruction table further comprising the following steps:
indicating for each operand an operand source.

29. The method according to claim 28, the step of indicating further comprising the following steps:
optionally indicating an operand stack as the operand source;
optionally indicating an object field as the operand source; and
optionally indicating an object method as the operand source.

30. The method according to claim 29, the step of generating further comprising the following steps:
randomly generating an operand required by the selected instruction if a corresponding entry in the instruction table indicates that an operand for the selected instruction is obtained from an object.

31. The method according to claim 29, the step of generating further comprising the following steps:
randomly generating an operand required by the selected instruction if a corresponding entry in the instruction table indicates that an operand for the selected instruction is obtained from an object field.

32. The method according to claim 31, the step of randomly generating an operand further comprising the following steps:
determining an access type for the operand required by the selected instruction;
selecting a class from a set of classes including a current class, parents of the current class and classes unrelated to the current class when the access type is public;

selecting a class from a set of classes including the current class and the parents of the current class when the access type is protected;

selecting the current class when the access type is private;

randomly selecting a class when the access type is unspecified;

retrieving a set of fields from the selected class; and searching the set of fields for a field having an operand type required by the selected instruction.

33. The method according to claim 32, the step of randomly generating an operand further comprising the following steps:

storing the field in an instruction node.

34. The method according to claim 29, the step of generating further comprising the following steps:

randomly generating an operand required by the selected instruction if a corresponding entry in the instruction table indicates that an operand for the selected instruction is obtained from an object method.

35. The method according to claim 34, the step of randomly generating an operand further comprising the following steps:

determining an access type for the operand required by the selected instruction;

selecting a class from a set of classes including a current class, parents of the current class and classes unrelated to the current class when the access type is public;

selecting a class from a set of classes including the current class and the parents of the current class when the access type is protected;

selecting the current class when the access type is private;

randomly selecting a class when the access type is unspecified;

retrieving a set of methods from the selected class; and searching the set of methods for a method having an operand type required by the selected instruction.

36. The method according to claim 35, the step of randomly generating an operand further comprising the following steps:

storing the method in an instruction node.

37. The method according to claim 3, the step of initializing the instruction table further comprising the following steps:

indicating for each operand an operand destination.

38. The method according to claim 37, the step of indicating further comprising the following steps:

optionally indicating an operand stack as the operand destination;

optionally indicating an object field as the operand destination; and optionally indicating an object method as the operand destination.

* * * * *

UNITED STATES PATENT AND TRADEMARK OFFICE
CERTIFICATE OF CORRECTION

PATENT NO. : 5,913,064
DATED : June 15, 1999
INVENTOR(S) : Chi-Chung Chen

It is certified that error appears in the above-identified patent and that said Letters Patent is hereby corrected as shown below:

On column 2, line 12, please replace "weary" with --weakly--.

On column 3, line 57, please replace "That" with --that--.

On column 11, line 43, please replace "If however" with --If, however--.

On column 11, line 65, please replace "lo" with --to--.

On column 12, line 55, please replace "tis" with --this--.

Signed and Sealed this

Thirtieth Day of November, 1999

Attest:

Q. TODD DICKINSON

Attesting Officer

Acting Commissioner of Patents and Trademarks